D. E. PARIS.
Cook Stove.
No. 78,891. Patented June 16, 1868.
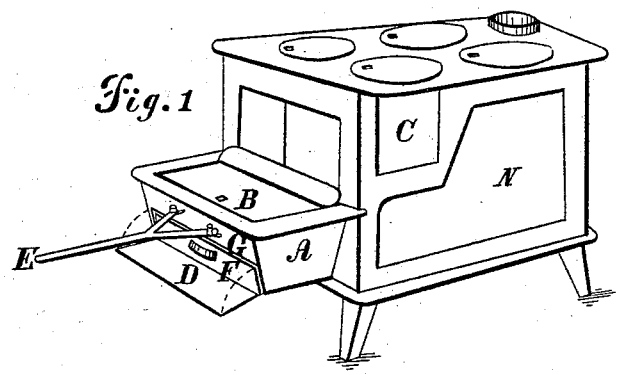
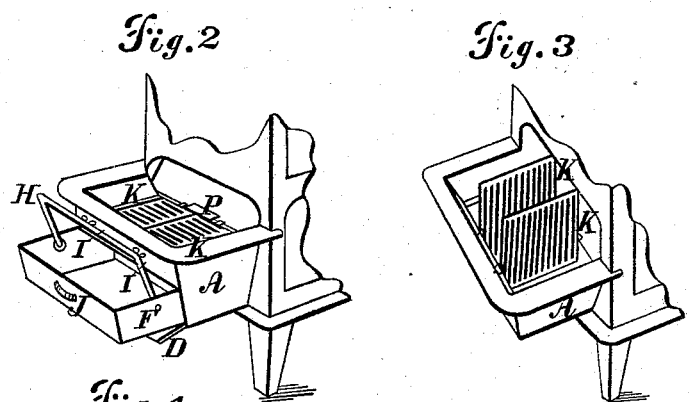
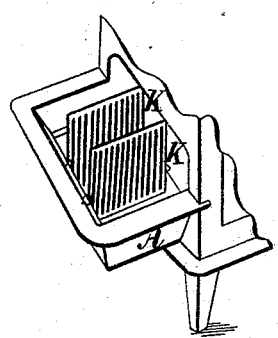
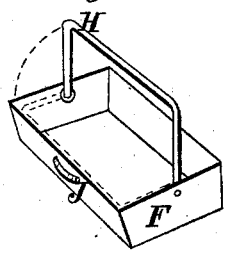
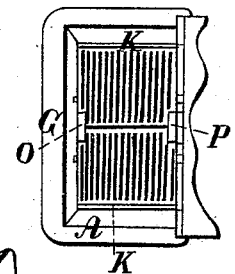
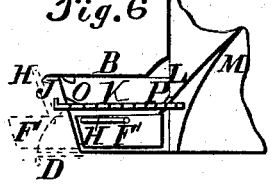
Witnesses:
Louis Potter
A G Burdet
Inventor
Danl E Paris

United States Patent Office.

DANIEL E. PARIS, OF TROY, NEW YORK.

Letters Patent No. 78,891, dated June 16, 1868.

---

IMPROVEMENT IN HEARTHS AND ASH-SIFTERS IN COOKING-STOVES.

---

*The Schedule referred to in these Letters Patent and making part of the same.*

---

TO ALL WHOM IT MAY CONCERN:

Be it known that I, DANIEL E. PARIS, of the city of Troy, in the county of Rensselaer, and State of New York, have invented a new and useful Improvement in Stove-Hearths, Ash-Sifters, and Ash-Pans; and I do hereby declare that the following is a full, clear, and exact description thereof, reference being had to the accompanying drawings, and to index-letters marked thereon, like letters representing like parts, in which—

Figure 1 is a perspective view of a cooking-stove, showing a part of my present improvement.

Figure 2 is a perspective view of the hearth of a cooking-stove, with the hearth-plate, or cover to the ash-pit, removed, so as to show the position of the sifting-grates. It also shows the ash-pan drawn partly out from its position below the sifting-grates.

Figure 3 shows the two sifting-grates standing upward, having dumped or discharged their contents into the pan below.

Figure 4 shows the pan removed from the hearth.

Figure 5 shows the ash-sifter or sifting-grates in position, together with the guard-pieces, front and rear, shown at O and P, which are also indicated by the same letters in Figure 6, which latter figure gives also a sectional view of all the parts.

The sifting-grate K, seen in fig. 6, is placed just over the ash-pan F, and, as it (or they, for it may be made in one or in two parts, as desired) is vibrated, the ashes fall, through the grate, into the pan below. The pan is then removed from the front, as seen in fig. 2, and the ashes emptied or thrown out. The pan is then replaced, and the grates can then be dumped, or their contents discharged, into the pan, and thus the coals are then removed in the same way as the ashes were, and thrown out or put where wanted; or the coals can be shovelled out of the ash-pit, or off the sifting-grates, instead of dumping them into the pan, as above described; but, if this is done, there would be no need of making them to dump, nor would there be need to make them in two pieces, except to facilitate vibration. The latter, however, would be a sufficient reason, for they vibrate much easier when made in two pieces than when made in one piece. They also work with double force, for the pressure required to move one grate out, also, at the same time, moves the other back. Thus, double the vibration is secured with the same amount of power; but there would be no use in constructing them to dump, unless it is preferred to discharge the contents into the ash-pan below, and remove them in that way.

It will be seen, by figs. 5 and 6, that the guard-pieces O and P are so placed as to allow the grates to dump, a part of said guard-pieces going under the grates, and a part going over them; that is, where the grate, in dumping, bears or falls downward, the guard-pieces O and P are placed over the grates, as at the centre, for instance, of the ash-pit; and, as the outer edges of the grates rise upward when they are dumped, the guard-pieces are placed below the grates, so as to permit this motion. The use of these guard-pieces is simply to prevent the coals from falling below when the grate is in operation; and they may be solid, or cast with holes or slots, so as to allow the ashes to pass through; but they must be sufficiently near each other to prevent the coals from falling downward. There are many equivalents for these guards, so that no particular form need be minutely described, the indication of the purpose for which they are used being sufficient.

The plate L, seen in fig. 6, acts, not only as a support for the grates, but also as a slide or conducting-plate for the ashes and coals as they fall from the fire-grate down on to the sifting-grates K K. The double use of this plate is new. This plate also projects forward, away from the plate M, so as to allow the grates K K to vibrate backward. The guard-piece P may be formed also on this plate, and cast solid with it; but it would be better to make the guard-piece O separate from the hearth-front, and attach it to it.

The grates K K project, by means of the journals I I, through the hearth-front G, much the same as in my application for a patent, filed March 23, 1868, and they are vibrated, by means of the shaker E, in the same way as there described; but they do not move out and in the openings through the hearth-front, (except when vibrated;) that is, the grate is not removable, so as to be taken out of the stove, for there is no upper pan, as in my first application, the sides of the hearth-pit A forming the pan, and holding the coal and ashes as they lie on the sifting-grates.

The ash-pan F is drawn out from the front, as seen in fig. 2, the falling door D, seen in fig. 1, first having been let down horizontally with the bottom of the hearth A, at which position it remains, by means of stops or guards, cast on either the plate itself, or at or near the bottom of the hearth A, or on both pieces, said stops being so constructed that the plate D is prevented from falling downward below a level corresponding with the bottom of the ash-pit or hearth A. The piece D is thus arranged in order that the pan F may be drawn out and upheld, as seen in fig. 2, which is done by means of taking hold of the handle J, and pulling the pan forward until the bail H can be raised up perpendicularly, so that the ash-pan can be entirely removed and carried away.

This plate D thus has a double use. It closes the opening for the ash-pan, at the front of the hearth A, and forms also a support for it, when drawn out, until the bail can be got hold of, so that it can be carried.

The advantages secured by this invention are cheapness and economy of space. It is cheaper than where there are two pans, as in my former application, and as in Willis's application. The entire surrounding walls of the pan are saved, as is also the bail to the upper pan. Its economy in space is also considerable, because the surrounding walls of the pan take up considerable room. There may be mentioned a third advantage. The journals are always outside the stove, and always ready for use at any time, and this, too, without any expense of machinery to move them out and in.

The sifting-grates are dumped, or discharged of their contents, into the pan below, by putting one prong of the shaker E upon one of the projecting journals I I, and turning it over toward the centre of the hearth, by which means all the coals or ashes that lie thereon are tumbled into the pit or pan below. The shaker is then changed to the other journal, and, by a like movement, the other grate is discharged of its contents.

I am aware of drop-doors having been made heretofore for stoves, and, therefore, I do not claim the drop-door D broadly, but confine my claim to the combination here shown; and the main purpose or use of the said plate is to support the ash-pan, so that it can be drawn out of the hearth horizontally, and so remain resting on the piece D till the bail can be raised up perpendicularly, in order that the pan can be removed by means of the bail, and, when the pan is brought back, it can be set down upon the plate D, and then shoved into its proper place beneath the sifting-grates.

Having thus described my improvement, what I claim, and desire to secure by Letters Patent, is—

1. A movable sifting-grate or grates, placed permanently within the hearth or ash-pit of a stove, and made to vibrate by means of a handle or shaker, operated from the outside of the stove, in combination with the surrounding walls of said hearth, or their equivalent, which act as the sides of a pan, to hold the ashes and coals on said sifting-grates as they fall from the fire-grate above.

2. A covered sifting-chamber, the sides of which are formed by the hearth or ash-pit of the stove, and by the slide or conducting-plate below the fire-grate, the bottom of which is formed by an open or perforated sifting-grate or grates, and the top by a movable cover to said hearth, in combination with an ash-pan or ash-chamber, situated just below said grate or grates.

3. A sifting-grate or grates thus situated, constructed to dump or discharge its contents into a chamber or movable pan below, and in combination therewith, substantially as here shown and described.

4. An opening at the lower front of the hearth or ash-pit of a stove, of sufficient capacity to remove the ashes or an ash-pan from the chamber below the sifting-grate or grates, and in combination with said grate or grates, when the latter are constructed substantially as herein shown, or are placed permanently within the hearth or upper part of the ash-pit of a stove.

5. The closing of said opening at the lower front of the hearth by a drop-door or falling plate, having its lower edge or ends attached to the hearth or ash-pit, and so constructed that, when it is let down at or near a level with the bottom of said hearth, it will thus remain, for the purpose of supporting, and in combination with, the ash-pan, when the latter is made to be drawn out, in the manner and substantially as herein shown and described.

DAN'L E. PARIS.

Witnesses:
LOUIS POTTER,
PHILO D. PAUL.